United States Patent [19]

Yoshida

[11] Patent Number: 5,442,242
[45] Date of Patent: Aug. 15, 1995

[54] APPARATUS FOR DRIVING EXPANSION POLE FOR USE IN VEHICLE

[75] Inventor: Koichi Yoshida, Tomioka, Japan

[73] Assignee: Yoshiko Co., Ltd., Tomioka, Japan

[21] Appl. No.: 63,975

[22] Filed: May 20, 1993

[30] Foreign Application Priority Data

May 27, 1992 [JP] Japan ................. 4-160126
Nov. 19, 1992 [JP] Japan ................. 4-310598

[51] Int. Cl.⁶ ............................................. B60Q 1/00
[52] U.S. Cl. .................................. 307/10.1; 340/436
[58] Field of Search ............... 343/901, 902, 903, 715, 343/721; 200/52 R, 313, 314, 61.44; 116/202, 28 R; 307/9.1, 10.1, 113, 114; 361/160, 166, 189; 123/490; 340/434, 435, 480, 901, 691

[56] References Cited

U.S. PATENT DOCUMENTS

| 4,307,375 | 12/1981 | Marshall, Sr. | 340/436 |
| 4,603,333 | 7/1986 | Carlson | 343/903 |
| 4,755,791 | 7/1988 | Kuroda | 116/28 R |
| 4,910,368 | 3/1990 | Honda et al. | 200/314 |
| 4,935,746 | 6/1990 | Wells | 343/715 |
| 5,276,426 | 1/1994 | LoBello | 340/436 |

Primary Examiner—Todd Deboer
Assistant Examiner—Peter Gaujoo
Attorney, Agent, or Firm—Varndell Legal Group

[57] ABSTRACT

An apparatus for driving an expansion pole such as an expansion corner rod of an automobile including a motor for extending and shrinking said expansion pole, a main switch provided within a room of the automobile, and an auxiliary switch provided on the automobile at such a position that the auxiliary switch can be actuated from an outside of the automobile. When the auxiliary switch is actuated from the outside of the automobile, the motor is driven in a reverse direction to shrink the expansion pole. Therefore, the expansion pole can be shrunk without actuating the main switch provided within the room of the automobile. The auxiliary switch may be arranged within the expansion pole such that the auxiliary switch is actuated when the expansion pole is pushed down, pulled up or tilted.

9 Claims, 7 Drawing Sheets

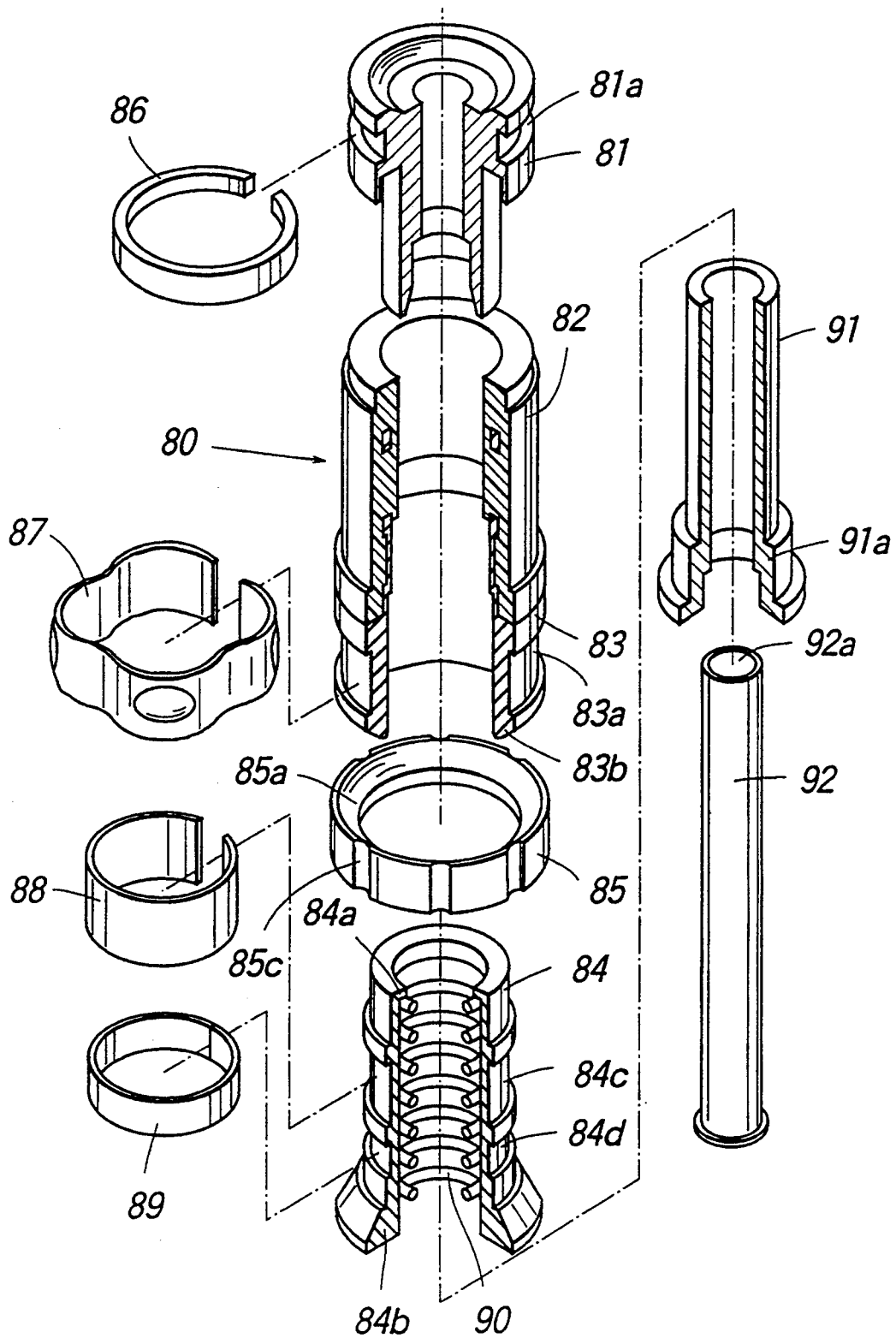

[5,442,242]

APPARATUS FOR DRIVING EXPANSION POLE FOR USE IN VEHICLE

BACKGROUND OF THE INVENTION

Field of the Invention

The present invention relates to an apparatus for driving an expansion pole for use in a vehicle such as expansion corner rod and expansion aerial rod of an automobile.

For instance, an expansion corner rod of an automobile comprises a telescopic rod in which an electric power supply means and a driving means are installed, a driving cord having a core wire and a rotating pipe being secured to the electric power supply means and driving means.

In such an expansion rod driving apparatus, when a power switch provided in a room of an automobile is operated, the driving cord is rewound out of a reel or the rotating pipe is rotated in one direction to extend the telescopic rod or the driving cord is wound on the reel or the rotating pipe is rotated in an opposite direction to shrink the telescopic rod.

In the known expansion rod driving apparatus, the rod is driven by operating a switch provided in the room of the automobile, so that if the automobile is to be washed while the rod is not shrunk, it is necessary to operate the switch in the room. This is apparently inconvenient.

SUMMARY OF THE INVENTION

The present invention has for its object to provide a novel and useful apparatus for driving an expansion pole for use in a vehicle, in which the expansion pole can be shrunk from the outside of the vehicle.

According to the invention, an apparatus for driving an expansion pole for use in a vehicle comprises:

a driving means for extending and shrinking said expansion pole including a motor which is rotated in forward and reverse directions and a mechanism for coupling said motor with said expansion pole;

a main switch provided within a room of the vehicle and connected such that when said main switch is actuated, said motor is connected to a power supply source and is driven in the forward direction to extend said expansion pole or in the reverse direction to shrink said expansion pole;

an auxiliary switch arranged on the vehicle such that the switch can be driven from an outside of the vehicle and is connected such that when said auxiliary switch is actuated from the outside of the vehicle in a condition in which said expansion pole is extended, said motor is driven in the reverse direction to shrink the expansion pole.

In the expansion pole driving apparatus according to the invention, the auxiliary electric switch is provided on the vehicle at such a position that the electric switch can be easily operated from the outside of the vehicle, the expansion pole can be shrunk from the outside without actuating the main switch provided within the room of the vehicle. Therefore, it is no more necessary to enter into the room of the vehicle in order to shrink the expanded pole.

BRIEF DESCRIPTION OF THE DRAWINGS

FIG. 9 is a expanded perspective view depicting the electric switch shown in FIG. 8.

DESCRIPTION OF THE PREFERRED EMBODIMENTS

Figure 1:
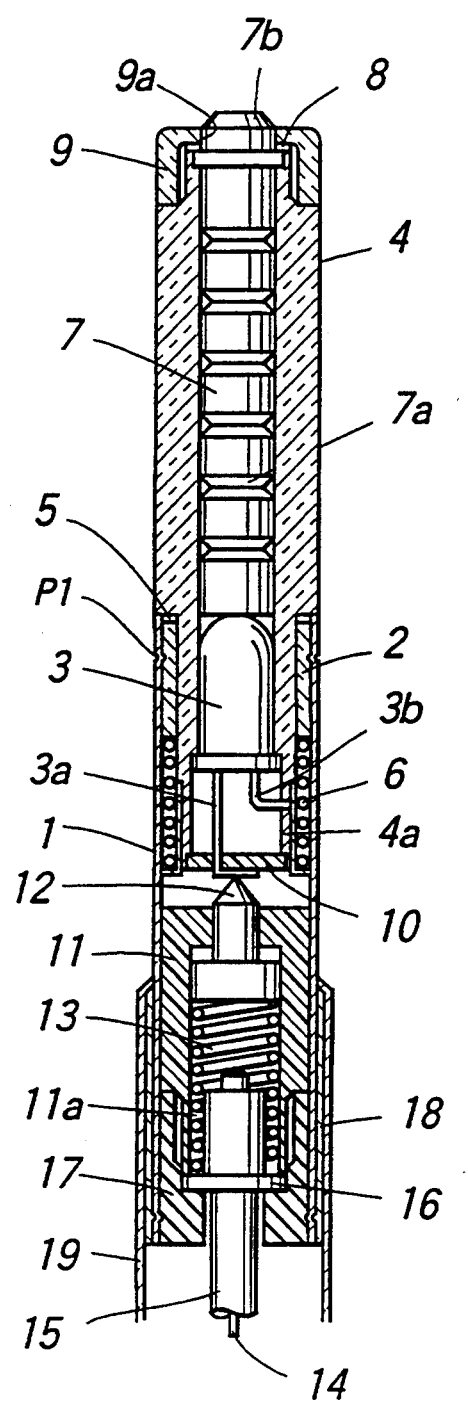
FIG. 1 is a cross sectional view illustrating a first embodiment of the expansion pole driving apparatus according to the invention.

FIG. 1 is a cross sectional view illustrating a first embodiment of the expansion pole driving apparatus according to the invention. In the present embodiment, the expansion pole is formed as an expansion corner rod of an automobile. An expansion rod main body includes a top pipe 1 made of electrically conductive material such as a metal. In a top portion of the top pipe 1 is inserted a guide sleeve 2 and they are fixed together by means of punches P1. In the guide sleeve 2 is slidably inserted a lower portion of a top lens 4 which has a central hole within which a light emitting element 3 is installed. Between the guide sleeve 2 and the top lens 4 there is arranged a water proof packing. To the lower end of the top lens 4 is secured a lower end of a coiled spring 6 so that the top lens is biased to be moved downward. Within the central hole of the top lens 4 there is further arranged an inner lens 7 having a plurality of grooves 7a and a top projection 7b. To the top end of the top lens 4 is secured a metal cap 9 having a hole 9a through which said top projection 7b of the inner lens 7 is extruded. Between the top lens 4 and the metal cap 9 there is arranged a water proof packing 8.

The light emitting element 3 comprises first and second terminals 3a and 3b, and the first terminal 3a is connected to a power supplying metal plate 10 secured to the lower end of the top lens 4. Therefore, the metal plate 10 is moved in an axial direction together with the light emitting element 3 and top lens 4 with respect to the top pipe 1. The second terminal 3b of the light emitting element 3 is extended along a recess 4a formed in the lower end of the top lens 4 by substantially a half of a circumference of the top lens and is connected to the top pipe 1 by means of a sleeve not shown.

Within the top pipe 1 there is further installed an electrically insulating sleeve 11 having a central hole 11a within which there are arranged a contact member 12 for establishing an electrical connection to the metal plate 10, a coiled spring 13 for pushing the contact member 12 toward the metal disk 10, and a metal ring 16 for fixing a drive cord 15 having a core conductor 14.

This cord fixing metal ring 16 is supported in position by means of an electrically insulating base 17 fixed within the central hole 11a of the insulating sleeve 11. The lower end of the top pipe 1 is inserted into a second pipe 19 by means of a top spring 18.

In a normal condition in which the top pipe 1 is not subjected to an external force, the top lens 4 is biased by the coiled spring 6 downward, so that the metal disk 10 is brought into contact with the contact member 12 and the core conductor 14 of the drive cord 15 is electrically connected to the first terminal of the light emitting element 3.

Figure 2:
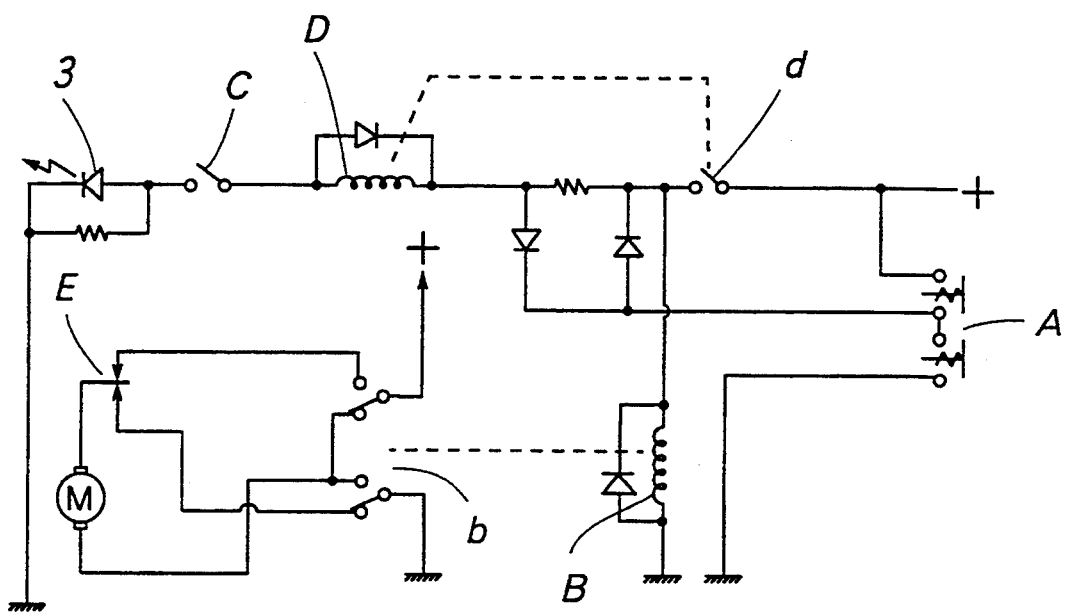
FIG. 2 is a circuit diagram of the expansion pole driving apparatus shown in FIG. 1.

FIG. 2 is a circuit diagram showing the expansion driving apparatus of the present embodiment. In FIG. 2, an auxiliary switch C represents the electrical connection between the metal disk 10 and the contact member 12 shown in FIG. 1. As explained above, in the normal condition, the auxiliary switch C is closed. In this condition, when a main switch A provided in the room of the automobile is operated, a relay D is energized to close its contact d. Then, the light emitting element 3 is energized to emit light. At the same time, a relay B is energized and its contacts b are changed from conditions shown in FIG. 2 and a current flows through a motor M in one direction and the motor M is rotated in a forward direction. The output shaft of the motor M is coupled with a drive cord reel not shown, and when the motor M is driven in the forward direction, the drive cord 15 is rewound from the reel and the top pipe 1 is moved upward relative to the second pipe 19. When the top pipe 1 is moved into the uppermost position, a three-contact switch E is operated and the motor M is deenergized. However, the light emitting element 3 is kept energized.

When the main switch A in the room is actuated, the relays B and D are deenergized so that the relay contact d is opened and the light emitting element 3 is lit off and at the same time the relay contacts b are changed into the conditions shown in FIG. 2 and the current flows through the motor M in the opposite direction so that the drive cord 15 is taken up the reel and the top pipe 1 is inserted into the second pipe 19.

In a condition in which the top pipe 1 has been moved into the uppermost position, when the top pipe 1 is lifted against the force of the coiled spring 6 such that the metal disk 10 is separated from the contact member 12, the auxiliary switch C in FIG. 2 is opened and the contact d is opened although the main switch A in the room is operated. Therefore, the light emitting element 3 and relay B are deenergized. Then, the relay contacts b are changed into the condition shown in FIG. 2 and the motor M is energized in the opposite direction, so that the drive cord 15 is taken up and the top pipe 1 is inserted into the second pipe 19. After the top pipe 1 has been moved into the lowermost position, the three-contact switch E is changed and the motor M is stopped. In this manner, the extended corner rod can be shrunk from the outside of the automobile.

Figure 3:
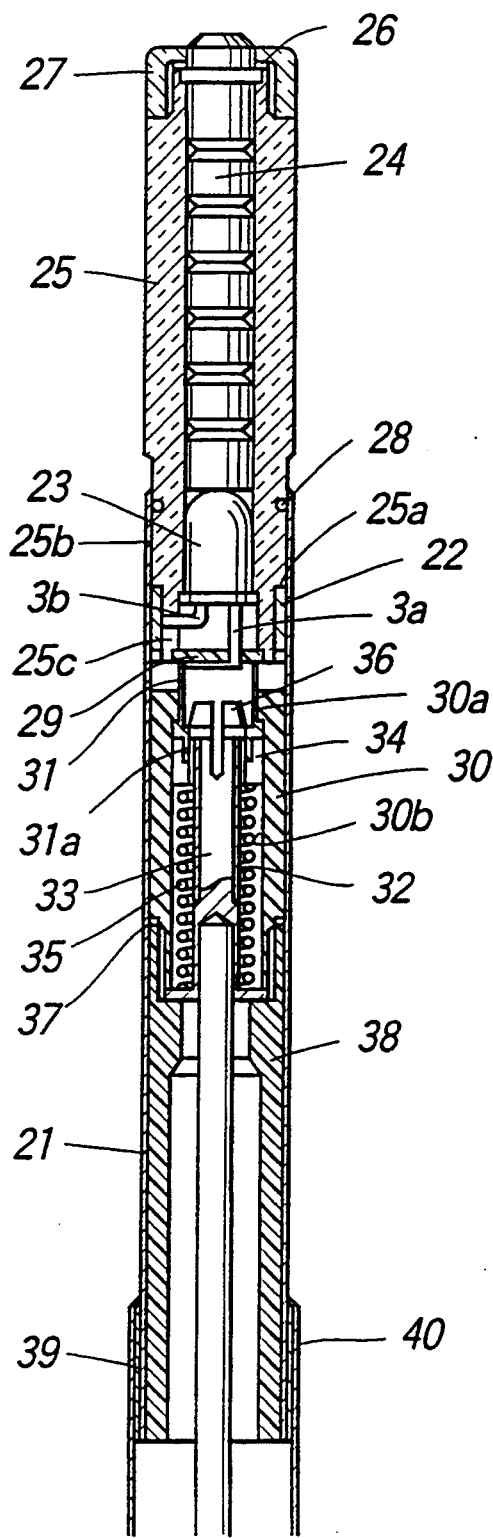
FIG. 3 is a cross sectional view depicting a second embodiment of the expansion pole driving apparatus according to the invention.

FIG. 3 is a cross sectional view illustrating a second embodiment of the expansion rod driving apparatus according to the invention. In the present embodiment, the extended rod can be shrunk by pushing down the top lens relative to the top pipe. That is to say, within a top pipe 21 there is provided a ring-shaped contact spring 22 into which a lower small diameter portion 25a of a top lens 25 having a light emitting element 23 and an inner lens installed therein is slidably inserted. To an upper portion of the top lens 25 is secured a lens cap 27 by means of a water proof packing 26. One terminal 3a of the light emitting element 23 is connected to a power supplying metal disk 29 which is secured to a large diameter portion 25b of the top lens 25. The other terminal 3b of the light emitting element 23 is extended along a recess 25c over a half of a circumference and is connected to a slidable contact spring 22 by means of a metal sleeve not shown.

Below the metal disk 29 there is arranged an insulating sleeve 30 by interposing a predetermined space therebetween. Within a top portion 30a of the insulating sleeve 30, is slidably arranged a slide switch metal sleeve 31. The slide switch sleeve 31 has formed therein a small diameter portion 31a into which a top portion of a power supplying center metal rod 33 covered with an insulating tube 32 is slidably inserted. Under the large diameter portion 31a of the slide switch metal sleeve 31, an insulating slide bush 34 is slidably arranged. Below the insulating slide bush 34 is arranged a coiled spring 35 so that the insulating slide bush 34 and slide switch metal sleeve 31 are biased upward and the top end of the slide switch metal sleeve 31 is brought into contact with the metal disk 29. At a top end of the central metal rod 33 there is secured a jaw portion 36 made of metal. The jaw portion 36 has such a diameter that the jaw portion is brought into contact with an inner wall of the small diameter portion 31a of the slide switch metal sleeve 31. Therefore, in an extended condition shown in FIG. 3, the one terminal 3a of the light emitting element 23 is electrically connected to the central metal rod 33 by means of the metal disk 29, slide switch metal sleeve 31 and jaw portion 36. Below the insulating sleeve 30 is arranged an insulating base 38 by means of a water proof packing 37, and the top pipe 21 is inserted into a second pipe 40 by means of a slide spring 39.

When the top pipe 21 is in the extended position illustrated in FIG. 3, the light emitting element 23 can be energized by means of the center metal rod 33, jaw portion 36, slide switch metal sleeve 31 and metal disk 29. In this condition, when the top lens 25 is pushed down against the force of the coiled spring 35, the slide switch metal sleeve 31 is moved downward to disconnect the small diameter portion 31a from the jaw portion 36 and the electric power supply to the light emitting element 23 is stopped. At the same time, the switch C in the circuit diagram shown in FIG. 2 is opened and thus the motor M is driven in the opposite direction and the top pipe 21 is moved downward into the second pipe 40.

In the second embodiment just explained above, the contact between the slide switch metal sleeve 31 and the center metal rod 33 is opened by pushing down the top lens 25. According to the invention, it is also possible to form a slit in a top end of the center metal rod 33 and to move the slide switch metal sleeve 31.

In the first and second embodiments so far explained, the pole shrinking switch is actuated by pulling up and pushing down the pole, but according to the invention, said switch may be actuated by twisting or rotating the pole.

Figure 4:
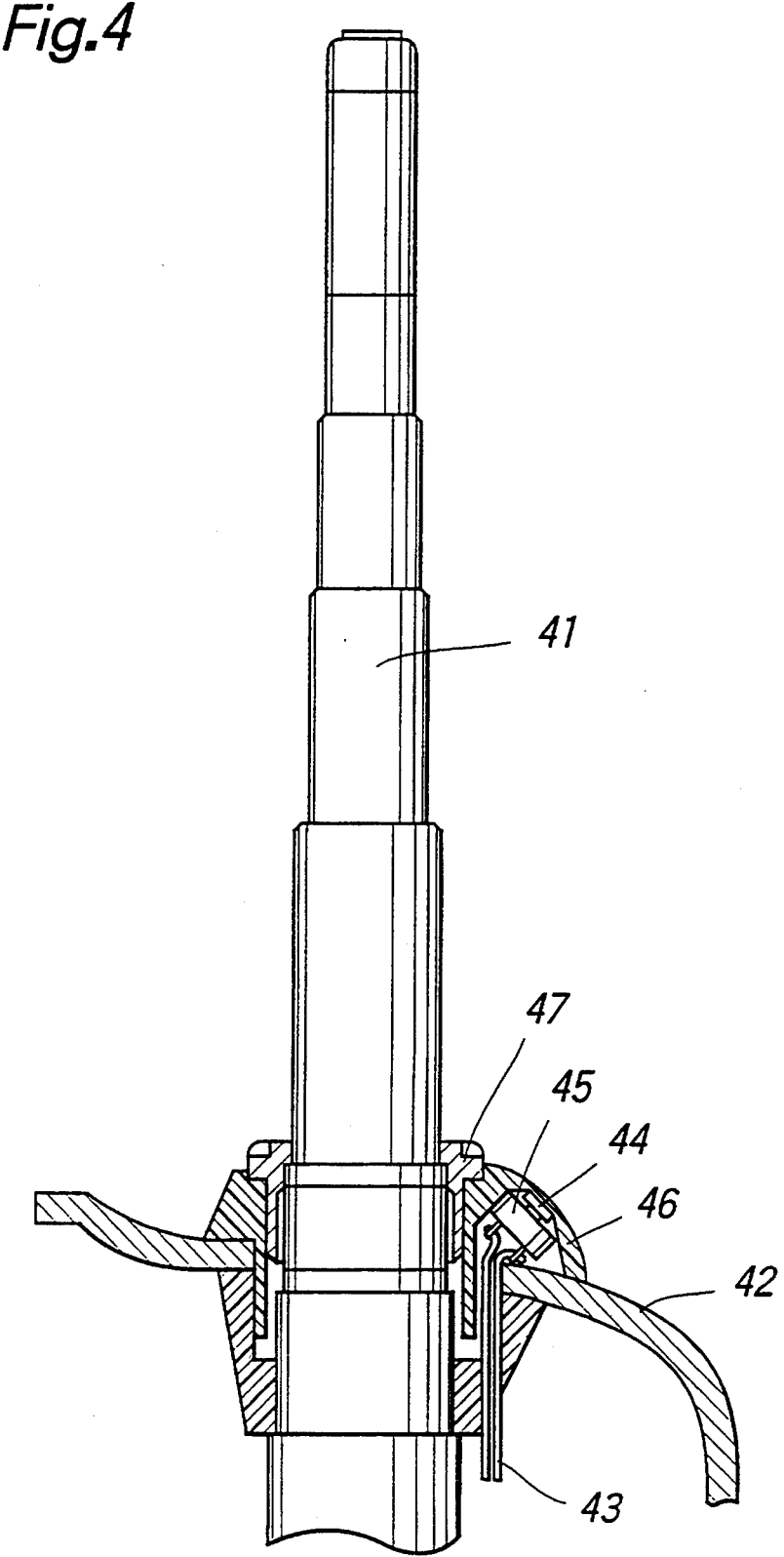
FIG. 4 is a partial cross sectional view showing a third embodiment of the expansion pole driving apparatus according to the invention.

FIG. 4 is a partially cross sectional view illustrating a third embodiment of the expansion pole driving apparatus according to the invention. In the present embodiment, an expansion pole 41 is provided on a shock absorbing bumper 42 of an automobile. To a power supply line 43 is connected a switch 45 having a push button 44. The switch 45 and push button 44 are covered with a bumper touch 46 made of resilient material in a liquid tight manner, so that they could not be seen from the outside. The bumper touch 46 is secured to the bumper 42 by means of a fixing nut 47 in an usual manner.

The switch 45 constitutes the switch C in the circuit diagram shown in FIG. 2, so that when the push button 44 is depressed over the bumper touch 46, the switch C is opened and the relay D is deenergized to drive the motor M in the reverse direction so that the extended pole 41 is shrunk.

Figure 5:
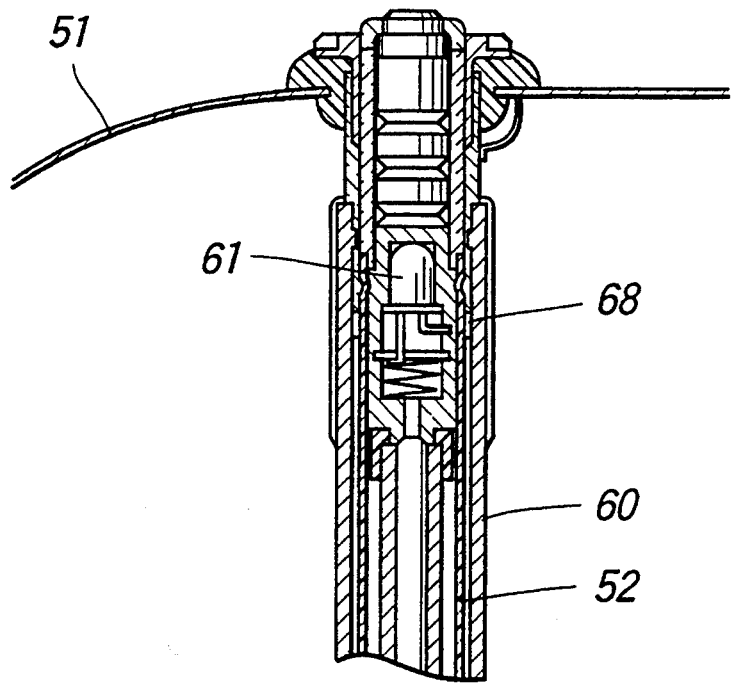
FIG. 5 is a cross sectional view illustrating a fourth embodiment of the expansion pole driving apparatus according to the invention.
Figure 6:
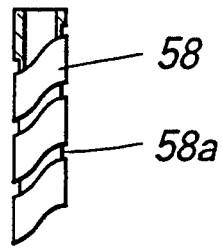
FIG. 6 is a partial cross sectional view depicting the rotary pipe shown in FIG. 5.
Figure 7:
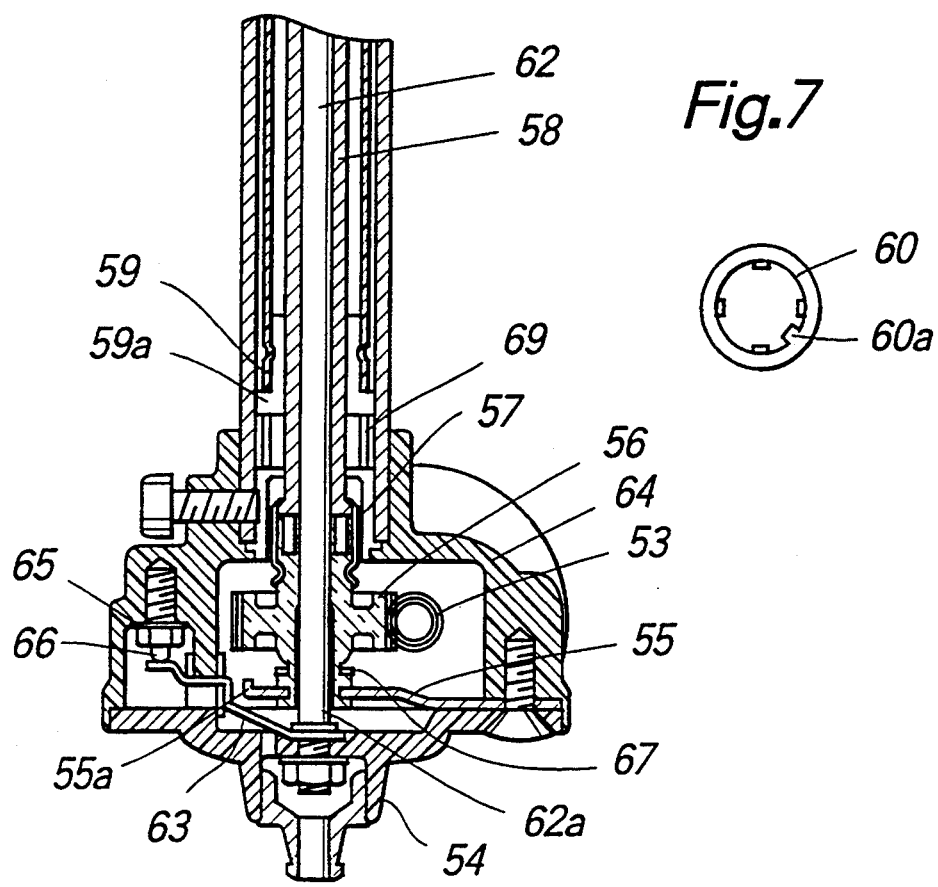
FIG. 7 is a plan view showing an outer tube illustrated in FIG. 5.

FIG. 5 is a cross sectional view depicting a fourth embodiment of the expansion pole driving apparatus according to the invention. In the present embodiment, a expansion pole 52 is provided in a rear trunk or boot 51 of an automobile. The pole 52 is expanded and shrunk by means of a warm gear 53. The warm gear 53 is coupled with the output shaft of the motor M and is engaged with a warm wheel 56 which is secured to a main body 54 by means of a stabilizing plate 55. To the warm wheel 56 is connected a joint pipe 57 and a rotating pipe 58 is coupled with the joint pipe 57. In an outer surface of the rotating pipe 58 there is formed a helical groove 58a as illustrated in FIG. 6, and an expansion nut 59 is engaged with the helical groove 58a. To the expansion nut 59 is secured a lower end of the expansion pole 52. The expansion nut 59 has a flange 59a at its lower end and an outer surface of the flange is engaged with a recess 60a formed in an outer pipe 60 shown in FIG. 7.

Within the rotating pipe 58 is inserted a center rod 62 made of electrically conductive metal for supplying the electric power to a light emitting element 61. A lower base portion 62a of the center rod 62 is secured to the main body 54 together with a switch plate 63 for connecting the center rod to the electric power supply source. In a usual state, a free end of the switch plate 63 is brought into contact with a switch metal pin 66 which is secured to a gear switch housing 64 via a power supply lug 65. It should be noted that at a lower end of the warm wheel 56 is provided a limit center plate 67 for actuating the three-contact switch E shown in FIG. 2. Within the outer pipe 60, there are arranged upper and lower cushions 68 and 69, respectively for reducing mechanical shock at the upper and lower limits.

The light emitting element 61 is energized by means of the power supply lug 65, switch metal pin 66, switch plate 63, and center rod 62. When the warm gear 53 is rotated in the forward direction to rotate the rotating pipe 58 in the forward direction, the expansion nut 59 is moved upward so that the expansion pole 52 is extended. When the upper end surface of the flange 59a of the expansion nut 59 is urged against the upper cushion 68, the warm wheel 56 is moved downward by the repelling force, so that the upper contact of the three-contact switch E in FIG. 2 is opened and the motor M is deenergized.

Usually the apparatus is kept in this stable condition and the expansion pole 52 is in the extended condition. When the expansion pole 52 is pushed downward, an end 55a of the stabilizing plate 55 is brought into contact with the switch plate 63 and thus the switch plate 63 is moved downward and is disconnected from the switch metal pin 66. In this manner, the switch C shown in FIG. 2 is opened and the light emitting element 61 is deenergized. At the same time, the motor M is driven in the reverse direction and the expansion pole 52 is shrunk. When a lower end surface of the flange 59a of the expansion nut 59 is urged against the lower cushion 69, the warm wheel 56 is moved upward by the repelling force, so that the lower contact of the three-contact switch E is opened to deenergize the motor M.

Figure 8:
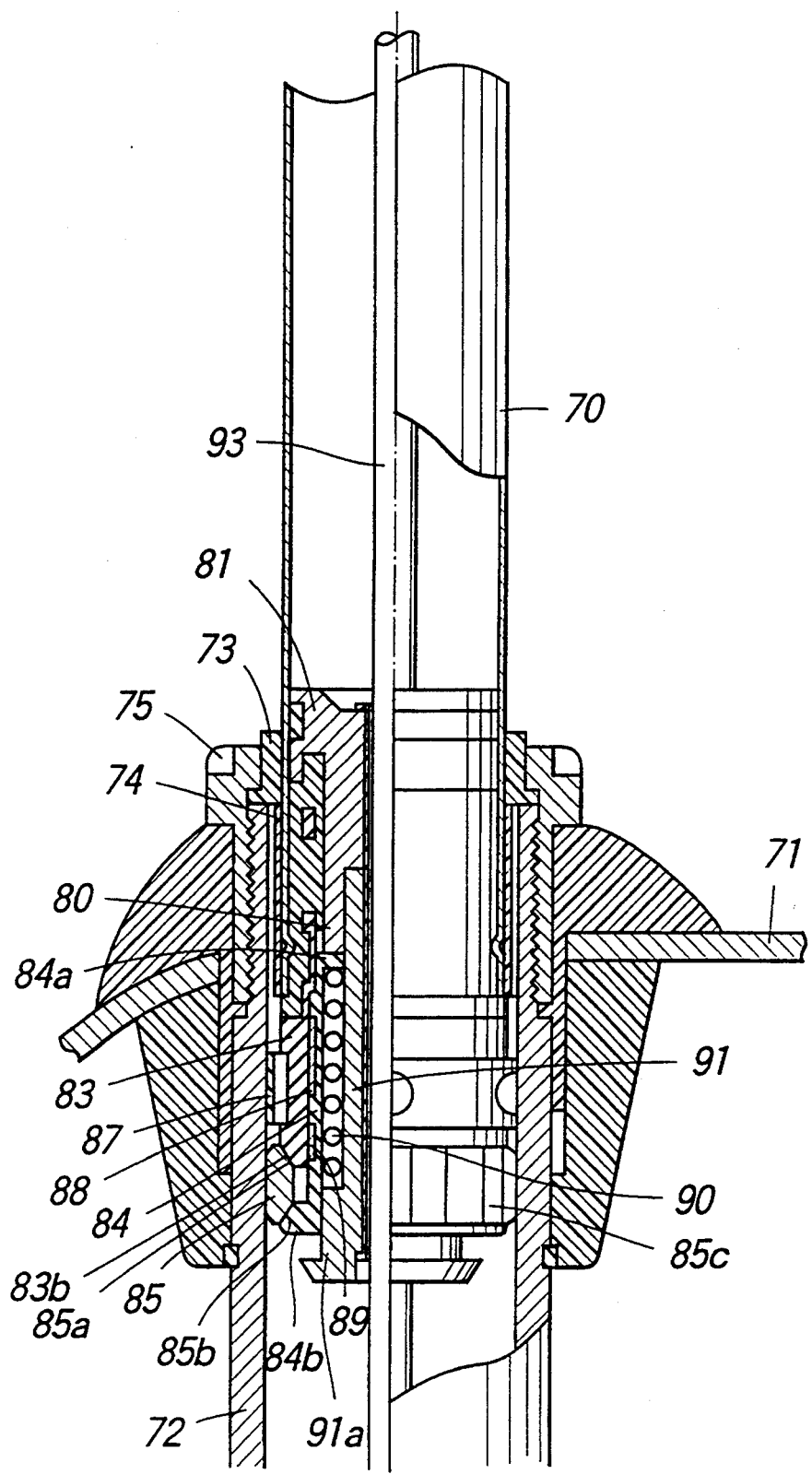
FIG. 8 is a cross sectional view showing a fifth embodiment of the expansion pole driving apparatus according to the invention.

FIG. 8 is a cross sectional view showing a fifth embodiment of the expansion pole driving apparatus according to the invention. An expansion pole 70 is inserted into a supporting pipe 72 secured to a bumper 71 and is fixed in position by a nut 75 by means of spacers 73 and 74 made of insulating material. Between a lower base portion of the expansion pole 70 and the supporting pipe 72 there is arranged a switch 80. As shown in FIG. 9, the switch 80 comprises a first conductor 81, a second conductor 82 which is connected to a lower end of the first conductor 81 by means of an insulator 82, a movable member 84 which is inserted into the second conductor 83 from its bottom and is resiliently biased toward the first conductor 81, and a switch ring 85 arranged between the movable member 84 and the second conductor 83. The second conductor 83 is fixed to the first conductor 81 by inserting the lower portion of the first conductor into the insulator 82 secured to the second conductor by welding and then calking the insulator.

The first conductor 81 is formed in the form of a cylinder having an upper large diameter portion and a lower small diameter portions. In the large diameter portion of the first conductor 81 there is formed a groove 81a into which a ring 86 made of conductive material is inserted. The ring 86 has such an outer diameter that it is firmly contacted with the inner wall of the expansion pole 70 made of metal. The second conductor 83 is also formed as a cylinder and in its outer surface there is formed a groove 83a into which a slightly corrugated ring 87 is clamped. The ring 87 is made of metal and is resiliently urged against the inner wall of the supporting pipe 72. A lower end face 83b of the second conductor 83 is tapered at substantially 45 degrees.

The movable member 84 is formed as a sleeve and has formed an inner jaw portion 84a at its top end and an outer jaw portion 84b as its lower end. In an outer surface of the movable member 84 there is formed a plurality of grooves 84c into which are inserted rings 88 and 89 made of conductive material. The lower end face of the outer jaw portion 84b is tapered at substantially 45 degrees. The movable member 84 is inserted into the second conductor 83 by means of a switch ring 85 such that the rings 88 and 89 are slidably contacted with the inner wall of the second conductor 83.

Within the movable member 84 there is provided a coiled spring 90. An upper end of the coiled spring 90 is urged against the inner jaw portion 84a formed in the second conductor 84 and a lower end of the coiled spring is urged against an outer jaw portion 91a formed at a lower end of a spring supporting member 91 made of synthetic resin. Within the spring supporting member 91 and first conductor 81 is inserted a thin pipe 92 having a center hole 92a through which a drive cord 93 is passed.

Upper and lower end faces 85a and 85b of the switch ring 85 are tapered at substantially 45 degrees so that they are intimately brought into contact with the tapered end face 83b of the second conductor 83 and the tapered face of the outer jaw portion 84b of the movable member 84, respectively. In an outer surface of the switch ring 85 there are formed a plurality of grooves 85c extending in an axial direction so that the water can escape through these grooves.

A light emitting element not shown is provided at the top of the expansion pole 70 and is connected to the body earth by means of the expansion pole 70, switch 80 and supporting pipe 72. When the expansion pole 70 is subjected to a lateral force, the pole is swung about a fulcrum at which the pole is fixed by the nut 75 and the switch ring 85 is urged by the inner wall of the supporting pipe 72. Then, the switch ring 85 is moved axially to widen a space between the second conductor 83 and the movable member 84 by the engagement of the tapered surfaces 85a and 85b of the switch ring 85 with the tapered faces of the second conductor 82 and movable member 84. Then, the movable member 84 which is biased upward by the coiled spring 90 is moved downward and the movable member 84 is disconnected from the first conductor 81. In this manner, the switch C shown in FIG. 2 is opened, and the light emitting element is deenergized and the expansion pole 70 is shrunk.

In the embodiment just explained above, the switch 80 is provided within the lowermost pipe of the expansion pole 70, but according to the invention, the switch may be arranged within an upper pipe such that the ring 87 and switch ring 85 are brought into contact with the inner wall of the relevant pipe In the expansion pole driving apparatus according to the invention, the contacts for shrinking extended pole, i.e. the switch C in FIG. 2 is provided to be actuated from the outside of the vehicle and the shrunk pole can be expanded again by actuating the switch A arranged within the room of the vehicle in an usual manner.

Further, in the above embodiments, the expansion pole is formed as the corner pole of the automobile, but according to the invention, the expansion pole may be an aerial pole which is expanded and shrunk by operating the engine switch or a power switch provided on a radio receiver.

As explained above in detail, in the expansion pole driving apparatus according to the invention, by operating the switch provided outside the vehicle, the expansion pole can be shrunk without operating the switch arranged within the room of the vehicle.

What is claimed is:

1. An apparatus for driving an expansion pole for use in a vehicle comprising:
   a light emitting element arranged within said expansion pole;
   a driving means for extending and shrinking said expansion pole including a motor which is rotated in forward and reverse directions and a mechanism for coupling said motor with said expansion pole;
   a main switch connected such that when said main switch is actuated, said motor is connected to a power supply source and is driven in the forward direction to extend said expansion pole or in the reverse direction to shrink said expansion pole; and
   an auxiliary switch arranged within said expansion pole such that the auxiliary switch can be actuated from an outside of the vehicle and is connected such that when said auxiliary switch is actuated from the outside of the vehicle in a condition to which said expansion pole is extended, said light element is deenergized and said motor is driven in the reverse direction to shrink said expansion pole, said auxiliary, switch comprising a first contact provided on a stationary member, a second contact provided on a stationary, member, a second contact prodded on a movable member which is movable with respect to said stationary member in an axial direction of the expansion pole, and a movable means provided between said first and second contacts for converting a tilting movement of said expansion pole Into an axial movement such that said second contact is moved in the axial direction to actuate said auxiliary switch when said expansion pole is tilted.

2. An apparatus according to claim 1, wherein said auxiliary switch is arranged near a base portion of said expansion pole.

3. An apparatus according to claim 2, wherein said expansion pole is formed as an expansion corner rod secured to a portion of a shock absorbing bumper of the vehicle and said auxiliary switch is arranged within a bumper touch for securing the expansion corner rod to said portion of a shock absorbing bumper.

4. An apparatus according to claim 1, wherein said expansion pole includes at least one lens arranged above said light emitting element.

5. An apparatus according to claim 4, wherein said expansion pole Includes a top projection arranged above said at least one lens.

6. An apparatus according to claim 1, wherein said light emitting element is energized when said expansion pole is extended.

7. An apparatus according to claim 1, wherein said expansion pole is formed as an expansion corner rod.

8. An apparatus for driving an expansion pole for use in a vehicle comprising:
   a light emitting element arranged within said expansion pole;
   a driving means for extending and shrinking said expansion pole including a motor which is rotated in forward and reverse directions and a mechanism for coupling said motor with said expansion pole;
   a main switch connected such that when said main switch is actuated, said motor is connected to a power supply source and is driven in the forward direction to extend said expansion pole or in the reverse direction to shrink said expansion pole; and
   an auxiliary switch arranged on the vehicle such that the auxiliary switch can be actuated from an outside of the vehicle and is connected such that when said auxiliary switch is actuated from the outside of the vehicle in a condition in which said expansion pole is extended said light element is deenergized and said motor is driven in the reverse direction to shrink the expansion pole:
   wherein said auxiliary switch is arranged within said expansion pole and comprises a first contact provided on a stationary member and a second contact provided on a movable member which is moved with respect to said stationary member to actuate said auxiliary switch when a top portion of said expansion pole is pushed downward or pulled upward.

9. An apparatus according to claim 2, wherein said expansion pole is formed as an expansion corner rod.

* * * * *